United States Patent [19]

Kneifel et al.

[11] 4,303,493
[45] Dec. 1, 1981

[54] SEALING FRAME FOR STACKED ARRANGEMENT OF EXCHANGER MEMBRANES FOR ELECTRODIALYSIS

[75] Inventors: Klemens Kneifel, Geesthacht; Walther Hilgendorff, Tespe; Uwe Martens, Hohnstorf, all of Fed. Rep. of Germany

[73] Assignee: GKSS-Forschungszentrum Geesthacht GmbH, Geesthacht-Tesperhude, Fed. Rep. of Germany

[21] Appl. No.: 113,362

[22] Filed: Jan. 18, 1980

[30] Foreign Application Priority Data

Jan. 20, 1979 [DE] Fed. Rep. of Germany ....... 2902247

[51] Int. Cl.³ .............................................. B01D 13/02
[52] U.S. Cl. .................................................. 204/301
[58] Field of Search ............................. 204/180 P, 301

[56] References Cited

U.S. PATENT DOCUMENTS

| | | | |
|---|---|---|---|
| 3,201,339 | 8/1965 | Tsunoda et al. | 204/301 |
| 3,256,174 | 6/1966 | Chen et al. | 204/301 |
| 3,284,335 | 11/1966 | Tsunoda et al. | 204/301 |
| 3,761,386 | 9/1973 | Smith | 204/301 |
| 3,933,617 | 1/1976 | Yamamoto et al. | 204/301 |
| 4,172,779 | 10/1979 | Yamaguchi et al. | 204/301 X |
| 4,204,929 | 5/1980 | Bier | 204/180 PX |
| 4,233,146 | 11/1980 | Rothmayer et al. | 204/301 X |

*Primary Examiner*—Donald R. Valentine
*Attorney, Agent, or Firm*—Becker & Becker, Inc.

[57] ABSTRACT

A sealing frame for alternately arranged anion and cation exchanger membranes of a membrane stack for electrodialysis. The frame edges surround a chamber provided with a net-like spacer placed or inserted therein, and have oppositely located continuous supply and connection bores passing therethrough for the solution to be treated and for the solution enriched with or depleted of separated dissolved electrolyte or electrically non-charged dissolved materials. These bores alternately communicate by means of supply or discharge troughs or channels with the interior of the chamber. The supply and discharge troughs or channels diverge to such an extent in a direction toward the chamber interior that the flow media are distributed in essence over the complete width of the flow path between the cooperating supply and discharge troughs or channels. Furthermore, the net-like spacers extend as far as into the diverging regions of the supply and discharge troughs or channels.

5 Claims, 5 Drawing Figures

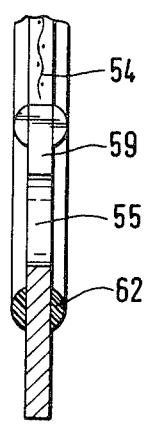
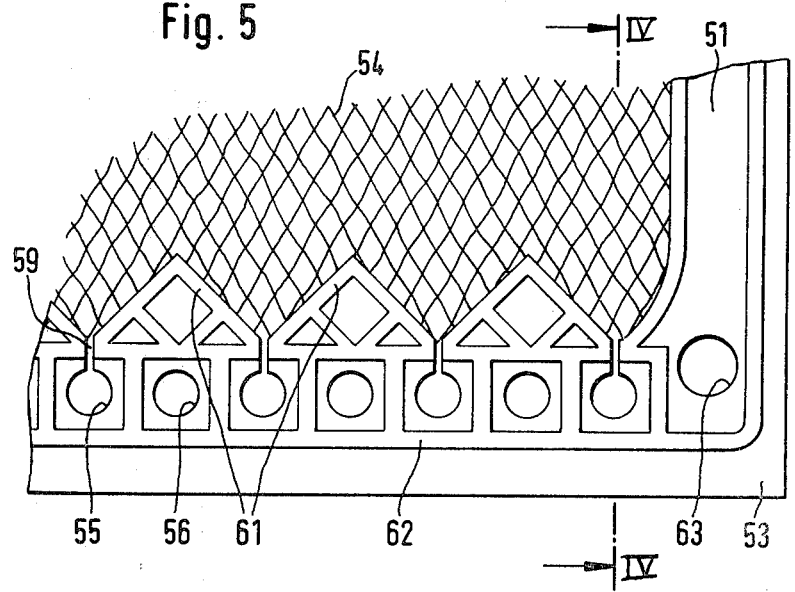

SEALING FRAME FOR STACKED ARRANGEMENT OF EXCHANGER MEMBRANES FOR ELECTRODIALYSIS

The present invention relates to a sealing frame for alternately arranged anion and cation exchanger membranes of a membrane stack for electrodialysis. The frame edges, which surround a chamber provided with an inserted net-like spacer, have oppositely arranged supply and connection bores passing therethrough for the solution to be treated or processed and for the solution enriched with or depleted of separated dissolved electrolyte or electrically non-charged dissolved materials. These bores alternately communicate by way of inlet or outlet troughs or channels with the interior of the chamber.

The electrodialysis is an electrochemical membrane method or procedure that is used for desalting or concentrating electrolyte solutions and for separating dissolved electrolyte from dissolved electrically non-charged materials. In this connection, electrically charged particles (ions) wander or pass through the membranes under the influence of an electrical field. The membranes selectively permit passage of either only the negatively charged particles (anions) or the positively charged particles (cations). If such membranes are alternately arranged in a stack between two electrodes in such a way that between the membranes through-flow chambers result, then the solution is desalted in every second chamber and is made more concentrated in the chambers located therebetween. For the formation of the chambers, a sealing frame with a net-like spacer, for example, a net or lattice fabric, lies respectively between two membranes. This sealing frame, aside from taking care of the chamber formation, most of all takes care of separation of the fluid flow to be diluted from the fluid flow to be concentrated. So that the chambers of a membrane stack alternately have both fluid flows passing or flowing therethrough, the sealing frames must contain both outlet openings for the supply of one solution in the corresponding chamber, and also must contain bores for the passage of the other solution into the next chamber.

The previously disclosed sealing frames have numerous disadvantages. Since the inlet and outlet troughs or channels for the fed or supplied solution and for the concentrated and diluted fluid flows cannot be permitted to be located too close together, in order to avoid internal leakage, these troughs or channels have been embodied with spacing and with relatively small cross section. The result of such embodiments is an undefined flow distribution in the chamber, which can very easily lead to crust formation, and accordingly to a hindrance of the through-flow. Additionally, in the region of the mentioned troughs or channels there could not be completely precluded a bending-through of the membranes, so that also by restriction of the cross sections the flow distribution is worsened. Membranes which bend-through or deflect, however, also very frequently lead to leakages between the two fluid flows. The decisive disadvantage of inlet and outlet troughs or channels arranged with spacing, however, is above all, the strongly reduced through-flow speed in the region between the neighboring or adjoining troughs or channels, so that particularly at these locations, a strong crust formation occurs, which finally not only reduces the efficiency, but can also lead to mechanical damage of the membranes.

Since, for attaining the smallest possible voltage drop between the electrodes, it is advantageous, with maximum number of membranes, to keep the stack thickness as small as possible, preferably very thin sealing frames are used.

It is an object of the present invention to provide an improved sealing frame for the membrane stacks of electrodialysis devices, said frame, with nominal thickness providing an optimum flow distribution, so that: the entire free membrane surface can be available for the salt transportation and under such circumstances no crust formations occur; an optimum sealing effect is assured even at low pressure for pressing into engagement, with a great form stability also being assured; and a minimum pressure drop occurs in the chambers.

This object, and other objects and advantages of the present invention, will appear more clearly from the following specification in connection with the accompanying drawings, in which:

FIG. 4 is a section taken along the line IV—IV in FIG. 5; and

FIG. 5 is an enlarged illustration of the lower right corner of the sealing frame of FIG. 3.

The sealing frame of the present invention is characterized primarily in that the supply and discharge troughs or channels diverge in the direction toward the interior of the chambers to such a great extent that the flow media are essentially distributed over the full width of the flow path between cooperating supply and discharge troughs or channels, and that the net-like spacers extend as far as into the diverging regions of the supply and discharge channels.

A plurality of diverging supply and discharge troughs or channels may be arranged on oppositely located frame edges and may be connected to bores. The supply and discharge troughs may adjoin each other in such a manner that the inner edges of the oppositely located frame edges have a zig-zag contour. The frame edges, including the diverging channel parts, may be made of a hard synthetic material stable in form, with an additional plastic sealing material coating thereon.

As material for the sealing frames, soft rubbers or synthetic materials have been predominantly used, although for different applications and with utilization or installation of certain types of membranes also hard materials are usable or even necessary.

Only in connection with a few types of membranes (relatively thick, soft membranes) do hard materials result in a sufficient sealing effect, though, however, they provide a good stability of the membrane stack. For sealing, a high pressure of engagement is necessary. Soft materials result in a better sealing effect, but the form stability of the chambers is insufficient, and the soft materials are also worse to handle.

It is therefore a further object of the present invention to provide form stability and maximum sealing characteristics for the sealing frame notwithstanding a minimum thickness. This last mentioned object is inventively resolved applying linear-shaped sealing layers or coatings by screen printing adjacent or adjoining sealing surfaces of the sealing frames, such as the chamber, bores, and supply and discharge channels. These sealing layers preferably comprise foamed synthetic materials, for example foamed epoxy resin.

Figure 1:
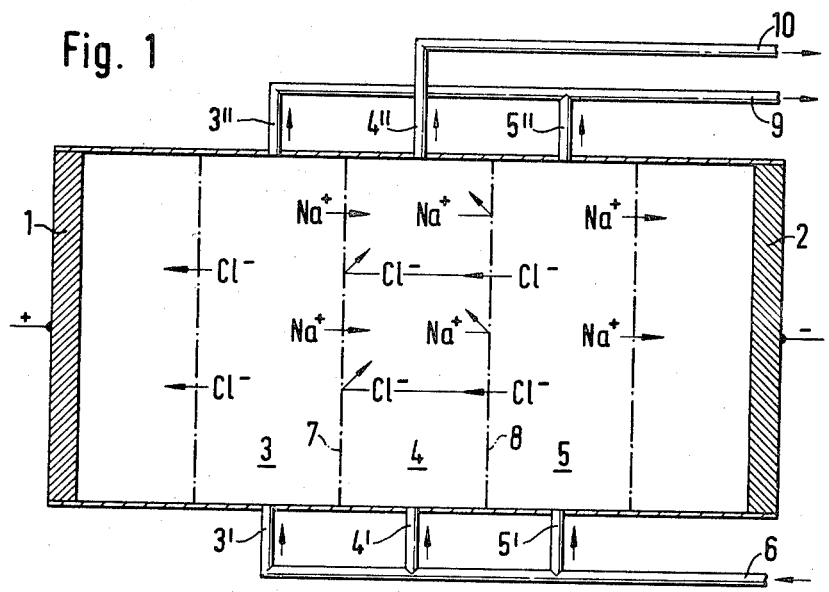
FIG. 1 is a schematic illustration of an electrodialysis arrangement for which the intensive sealing frames are provided.

Referring now to the drawings in detail, as an example of an electrodialysis method or procedure, FIG. 1 schematically shows the desalting of a cooling salt solution. Between the two electrodes 1 and 2, which have voltage applied thereto capable of passing a current of, for example, 5 amperes through the stack, there are located three chambers 3, 4, and 5. The solution to be desalted is supplied at 6 and enters by way of the connections or inlets 3', 4', 5' into the three chambers, 3, 4, and 5. Between the chambers 3 and 4 is located a cation-exchanger-membrane 7, and between the chambers 4 and 5 is located an anion-exchanger-membrane 8. Because of the applied potential, the negative Cl-anions wander or move as illustrated in FIG. 1 toward the electrode 1, while the positively charged Na-cations wander or move toward the electrode 2. By way of these ion current flows, there results in the chamber 4 a concentration of the solution supplied at 6, so that by way of the conduit 10 and the outlet or discharge 4" a concentrated solution can be withdrawn. The diluted solution in the chambers 3 and 5 can leave the mentioned chambers by way of the outlets or connections 3" and 5" and the conduit 9.

Figure 2:
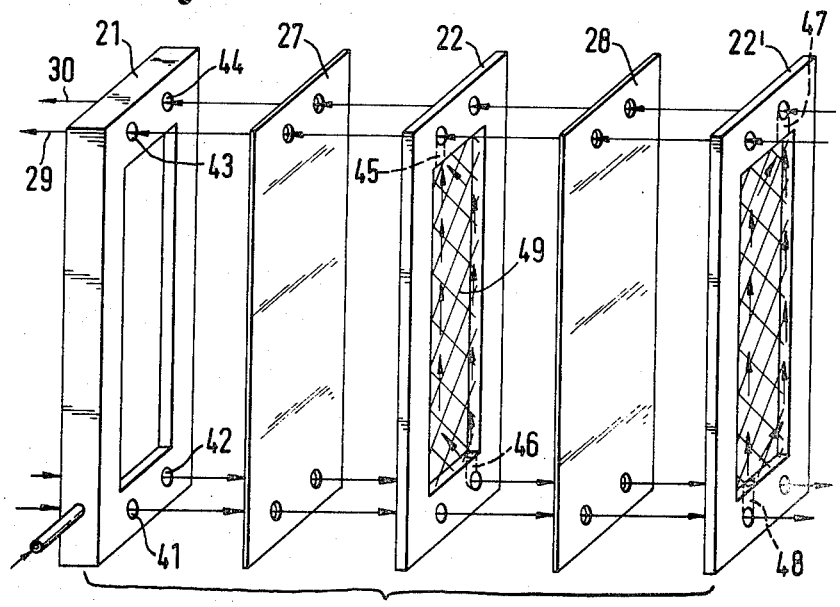
FIG. 2 is an exploded view of a membrane stack according to the prior art.

FIG. 2 shows in an exploded perspective illustration schematically an apparatus which operates according to FIG. 1. In order to obtain a compact construction, the conduits 9 and 10 have been located into the stack itself. As recognizable from FIG. 2, on two opposite sides of the electrode 21, the cation-exchanger-membrane 27, the interposed spacer window 22, the anion-exchanger-membrane 28 of the subsequent spacer 22', and so forth, are located bores which practically represent the realization of the connections 3', 4', 5', 3", 4", 5". Accordingly, the electrolyte solution to be treated is supplied by way of the bores 41, 42 to the electrode 21. The diluted solution collects in the bores 43 and can be withdrawn by way of a connection 29. In a corresponding manner, the concentrated solution can flow through the bores 44 in order then to be withdrawn at 30.

Hollow spaces in the electrodes and in the spacer, which forms a so-called sealing frame 22, form the chambers designated 3, 4, 5 in FIG. 1. The supplied electrolyte solution can come from the bore 42 of the sealing frame 22 by way of a flat trough or channel 46 to the interior of the chamber located between the two membranes 27 and 28. In the same manner, there occurs the feeding or supply of the chamber in the sealing frame 22' between the anion-exchange-membrane 28 and the subsequent non-illustrated cation-exchanger-membrane by way of the trough or channel 48, which is connected with the bore 41.

In practice, the entire membrane stack is clamped or stressed together with strong screw bolts, so that the electrodes, membranes and sealing frames lie rigidly upon each other, and the different bores 41, 42, 43, 44 practically form through-passages or channels, which alternately open into the chambers of the sealing frames. So that the membranes do not bend through or get deflected, but rather are supported in a maximum way, lattice-like spacers 49 are located in the chambers of the sealing frame 22; these spacers 49 preferably consist of a textile fabric.

Disadvantageous with the known sealing frames is that in the regions of the chambers, which adjoin the troughs or channels 45 and 46, there prevails a lower flow speed, so that crust formations can occur at these locations, which crust formations lead to undefined flow distributions and a poor utilization of the membrane upper surface.

Figure 3:
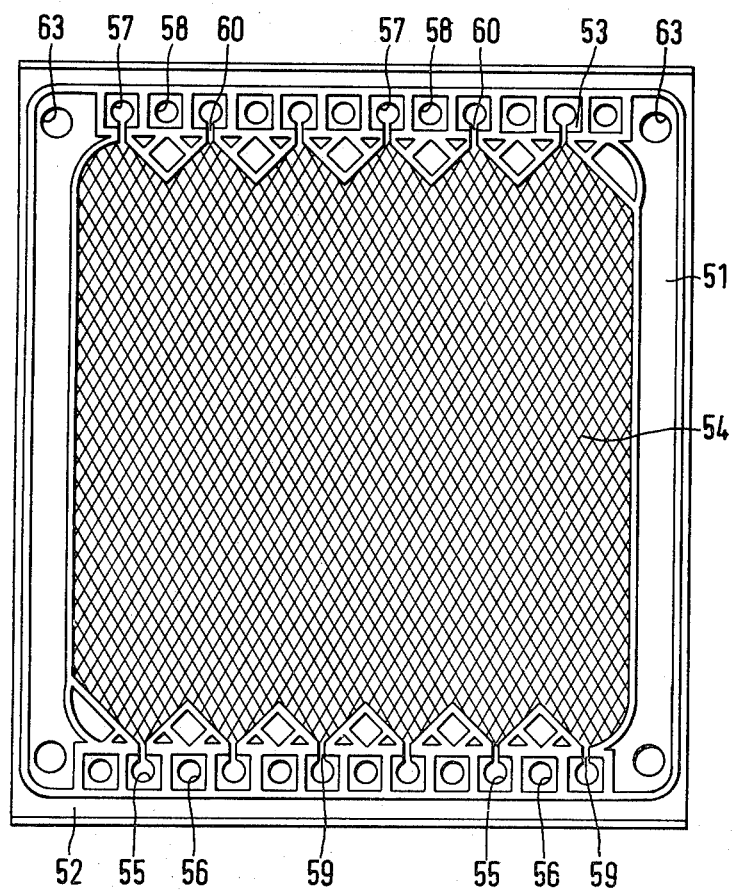
FIG. 3 is a plan view of an intensive sealing frame having a net or lattice web or fabric inserted therein.

The improved sealing frame proposed by the present invention is shown in FIGS. 3 and 4. FIG. 4 represents a reduction in size of the original to the scale of approximately 1:2. In a manner differing from the previously known sealing frame, a plurality of bores are inventively arranged on the oppositely located edges 52 and 53 of the sealing frame 51. These bores correspond to the previously mentioned bores 41 through 44. As an example, assume that the bores 55 and 56 serve for supplying the electrolyte solution. At the oppositely located frame side 53, there are provided the respectively displaced bores 57 and 58, which serve for discharging or removing the diluted and the concentrated solutions. Relatively narrow passages lead from the bores 55 and 57 in a known manner into the interior of the sealing frame, which contains as a spacer a net-like textile fabric or web 54 placed therein. The relatively narrow passages, which are connected to the bores 55 and 57, diverge for example at an angle of 90°. In this manner there results a zig-zag-like configuration of the chamber boundry or limits adjacent the frame side parts 52 and 53. The projecting triangular parts of the sealing frame lie practically in the regions of the chamber, which previously were impaired due to a reduced through-flow speed. Consequently, an orderly flow results between the supply and discharge troughs or channels 59 and 60, which are arranged relative to each other, and there remains practically no unused or unutilized portion of the neighboring or adjoining exchanger membrane. So that no reduced cross section can result in the diverging segments 61, the spacer 54 inserted in the chamber is brought or guided as far as to the base of the diverging sections 61.

As represented in FIG. 4 partially, in other words in the right segment with dashed lines 62, expediently at least one surface of the sealing frame 51 is provided with an additional plastic sealing material layering or coating. This sealing material layering extends in a linear manner along the edges of the chambers, through-passage bores 55-58, and supply and discharge troughs or channels 59, 60. It is of particular advantage to apply this sealing material layering 62 in a screen printing method or procedure, for which purpose a foamed synthetic material, purposefully a foamed epoxy resin, is especially suitable.

The corner bores 63 illustrated in FIGS. 3 and 4 serve for receiving and accommodating the clamping, tensioning bolts, or guide bolts which pass through the entire membrane stack.

The present invention is, of course, in no way restricted to the specific disclosure of the specification and drawings, but also encompasses any modifications within the scope of the appended claims.

What we claim is:

1. A sealing frame for alternately arranged anion and cation exchanger membranes of a membrane stack used for electrodialysis of a fluid, the frame comprising:
    edges which surround a chamber, which chamber is further defined by a cation membrane closing one side of the chamber and an anion membrane closing the other side of the chamber;

a screen member extending across the chamber inside of the frame;

connecting bores passing transversely through the edges of the frame in opposed first and second sides of the frame, the connecting bores being closed to the chamber and conveying untreated fluid into the chamber on the first side and treated fluid away from the chamber on the second side;

supply bores alternating with the connecting bores on the first side of the frame and having outlets open to the chamber, said supply bores being in communication with connecting bores in an adjacent frame;

discharge bores alternating with the connecting bores on the second side of the frame and having inlets open to the chamber, said discharge bores being in communication with connecting bores in an adjacent frame; said discharge bores being disposed directly across from the connecting bores in the first side of the frame and being displaced laterally from the supply bores in the first side of the frame, the supply bores being disposed directly across from the connecting bores in the second side of the frame whereby the supply and discharge bores are staggered with respect to one another, and V-shaped projections having pointed apexes extending into the chamber along the first and second sides, said V-shaped projections beginning and terminating with the outlets of the supply bores along the first side of the frame and the inlets of the discharge bores along the second side of the frame to provide opposed zig-zag contours which form diverging channels into the chamber which are staggered with respect to converging channels out of the chamber.

2. The sealing frame of claim 1 wherein the edges, including the diverging channels and converging channels, are formed of a hard, inherently stable material with an additional coating of resilient sealing material thereon.

3. A sealing frame in combination according to claim 2, in which said coating comprises a foamed synthetic material.

4. A sealing frame in combination according to claim 3, in which said coating is applied by a screen printing procedure.

5. A sealing frame in combination according to claim 4, in which said coating is applied in a linear shaped arrangement along edges of said chamber, said bores, and said channels.

* * * * *